INVENTORS
J.R. PARSONS
R.E. WIGHTMAN
BY Hudson & Young
ATTORNEYS

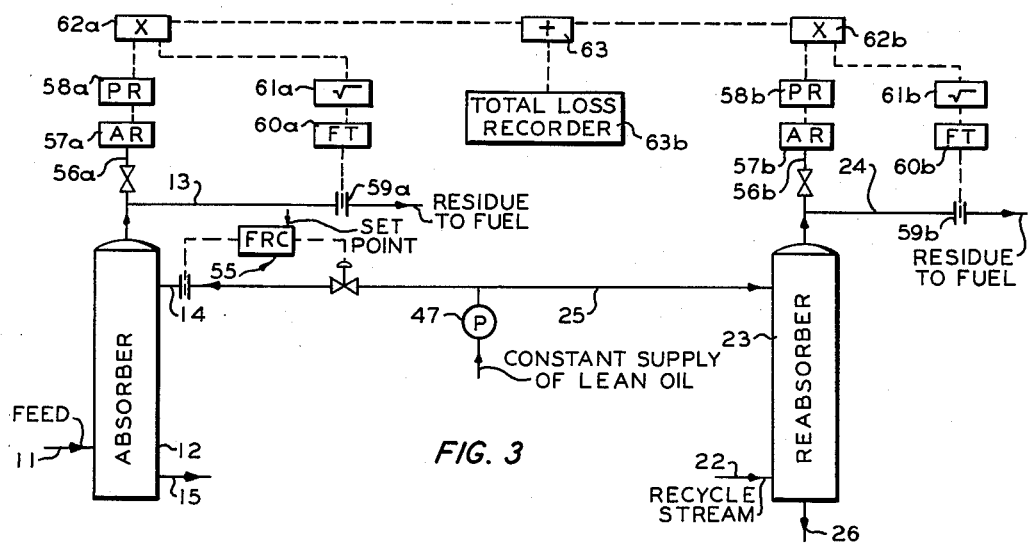
FIG. 3
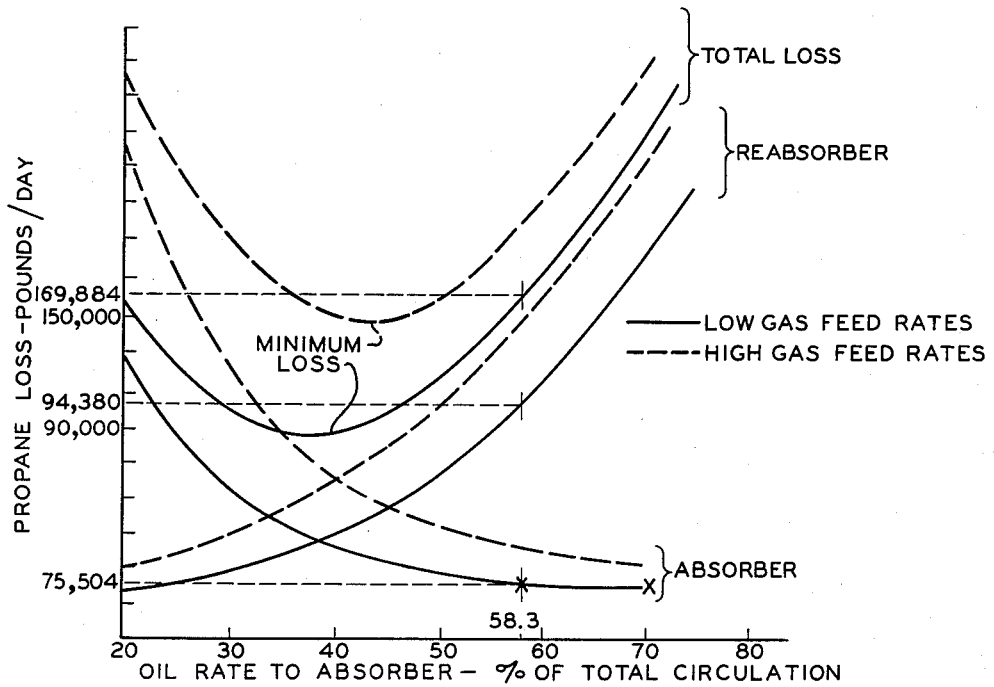
FIG. 2
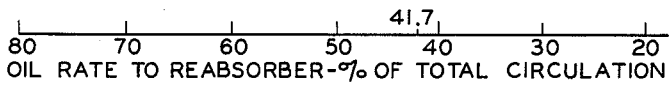
INVENTORS
J.R. PARSONS
R.E. WIGHTMAN

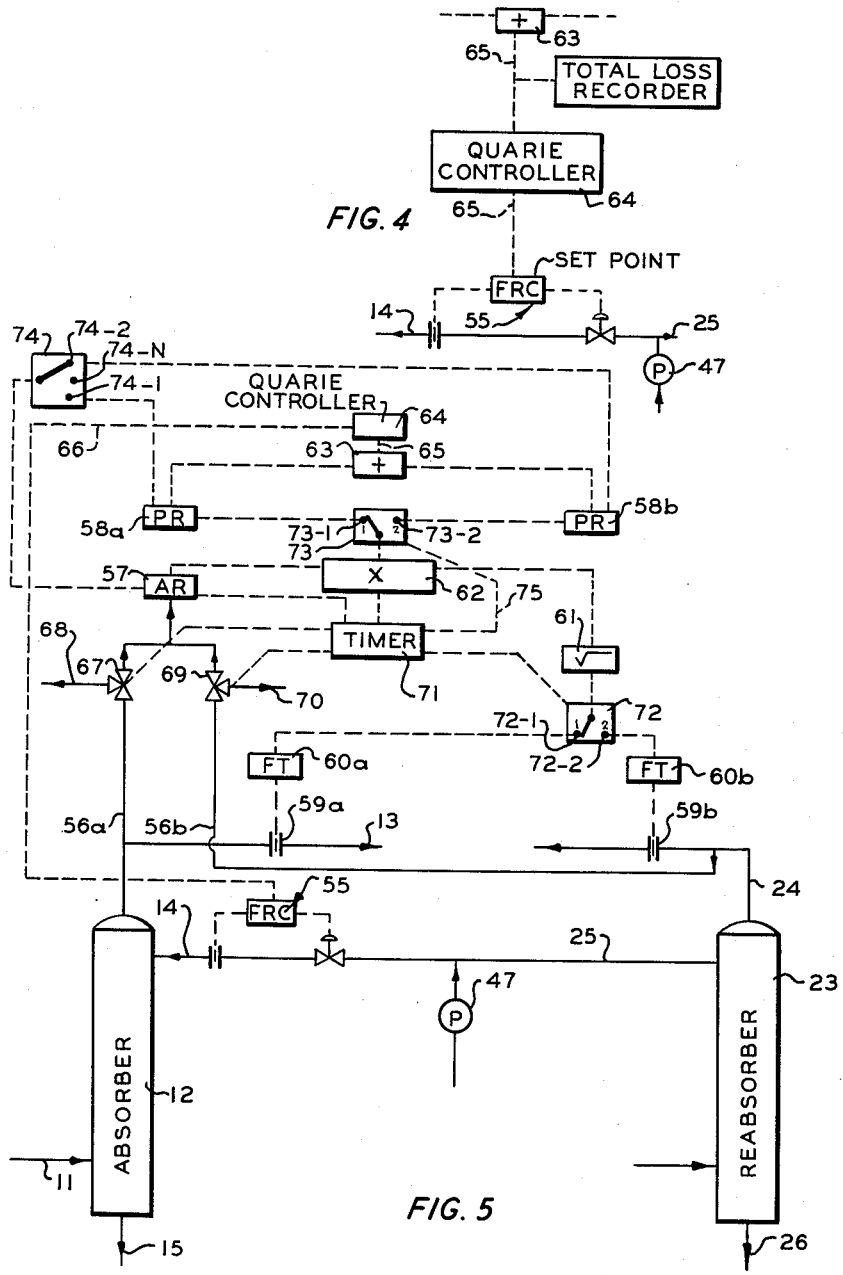

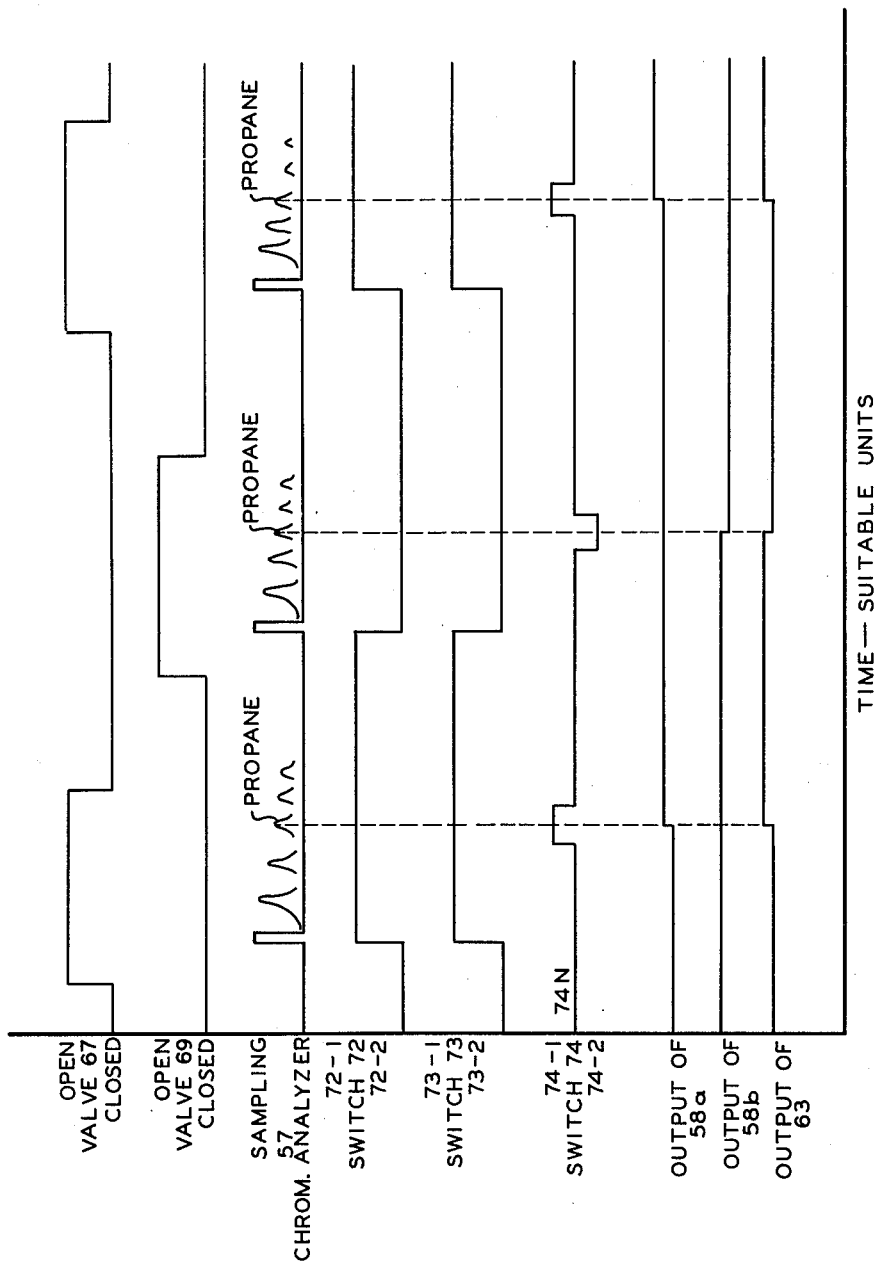

3,060,662
MINIMIZING PRODUCT LOSS FROM PARALLEL PROCESS STEPS

James R. Parsons and Robert E. Wightman, Bartlesville, Okla., assignors to Phillips Petroleum Company, a corporation of Delaware
Filed Dec. 31, 1959, Ser. No. 863,314
4 Claims. (Cl. 55—19)

This invention relates to the separation of a desired product from a feed stream containing the desired product and other products in which two similar process steps are operated in parallel by splitting a stream of processing fluid into two portions and regulating the ratio of the splitting to minimize the loss of the combined amounts of a selected control component in corresponding products of the processing steps and introducing the split portions of processing fluid into the parallel processing steps. In one aspect, the invention relates to regulation of the split to maintain the sum of the amounts of the control component in corresponding products of the parallel processing steps at a minimum.

In many natural gas gasoline extraction plants absorbers are employed in the natural gas absorption step and reabsorbers are used in subsequent absorption steps to reject components absorbed in the original absorption step and not desired in the absorption product. In the operation of such absorbers and reabsorbers, the lean absorption oil from a common run storage vessel is divided into two streams and these streams are separately used as the absorbents in the absorber and in the reabsorber. The rich oil streams from the absorber and the reabsorber are passed into a single stripper and the absorption oil after stripping and cooling, usually called lean oil, is run to the single run storage tank. Since the stripper usually operates at maximum capacity only a given quantity of absorption oil is available for use in both absorbers. About the only regulation of the absorption oil flow that can be made is regulation of the ratio of absorption oil flow to the absorber and to the reabsorber. One embodiment of this invention is specifically directed to the control of the ratio of the flow rates of the lean absorption oil to the absorber and to the reabsorber so as to maintain the sum of the propane in the off gas from the absorber and from the reabsorber at a minimum. In other words, since absorption plant off gas is usually used as fuel gas, this invention is directed to absorber and reabsorber operation so as to minimize propane loss in the fuel gas.

An object of this invention is to provide apparatus and a method for the control of the absorber and reabsorber of natural gas gasoline absorption plant operating in parallel as regards the lean absorption oil flow, to minimize the combined propane losses in the residue gas from the absorber and reabsorber.

Yet another object of this invention is to provide automatic control for such an operation.

Still other objects and advantages of this invention will be apparent from reading the following description which, taken with the attached drawing, forms a part of this disclosure.

In the drawing, FIGURE 1 illustrates the process flow of a natural gas gasoline extraction plant to which the present invention is applied.

FIGURE 2 shows curves illustrating the process of this invention.

FIGURE 3 illustrates the operation of this invention with manual control of a portion of the apparatus.

FIGURE 4 illustrates the fully automatic operation of the apparatus of FIGURE 3.

FIGURE 5 illustrates an alternate and fully automatic embodiment of this invention.

FIGURE 6 is a diagrammatic representation of the sequence of operational steps involved in this invention.

Figure 1:
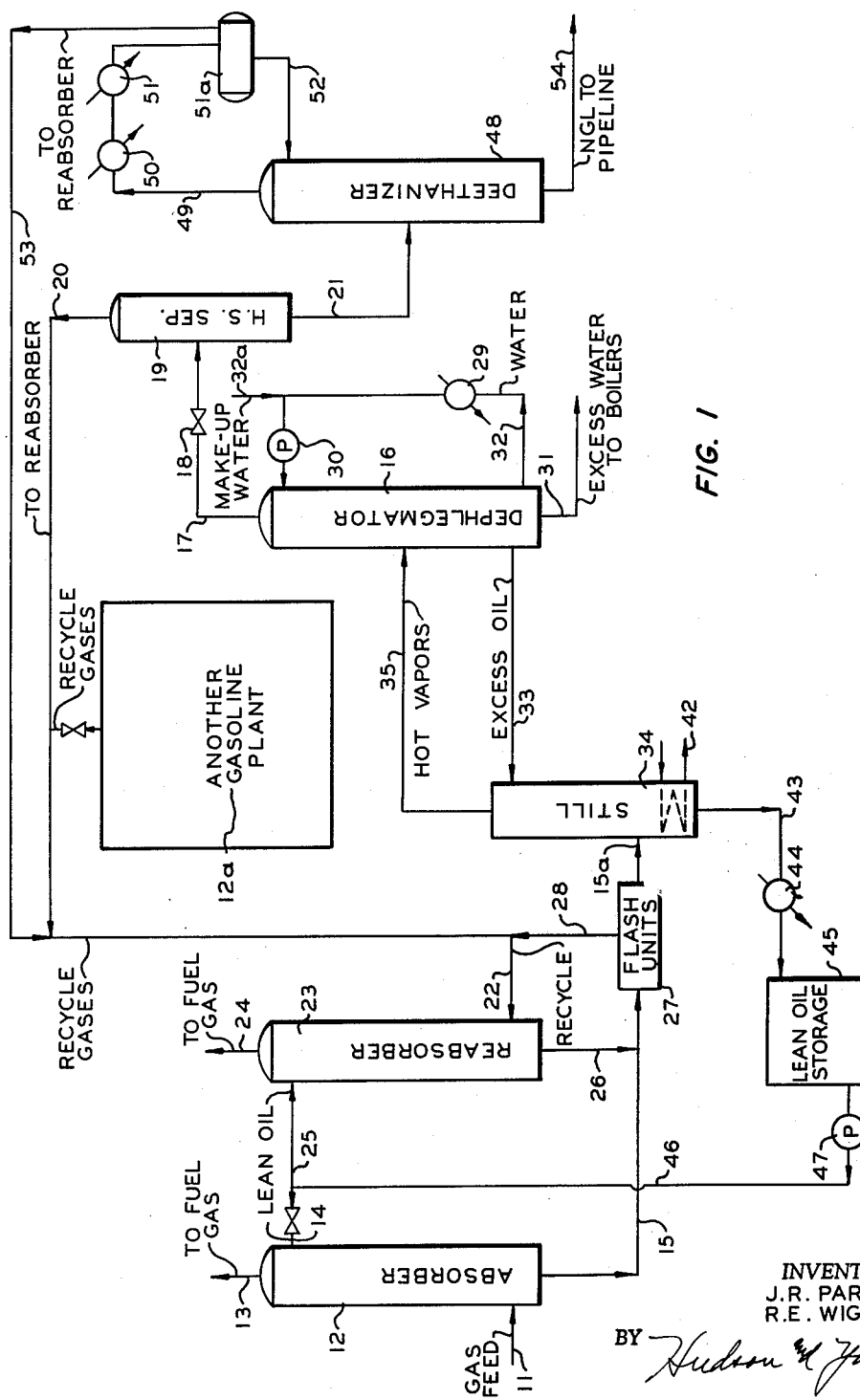

Referring now to the drawing, and specifically to FIGURE 1, reference numeral 11 identifies a pipe through which a raw natural gas feed stock flows into an absorber 12. This absorber is provided with suitable vapor-liquid contact promoting apparatus, such as bubble cap trays. A suitable absorption oil, such as a mineral seal oil, is introduced into column 12 through a pipe 14 and this oil flows downward from tray to tray as the feed gas or gaseous components thereof flow upward through the trays and bubble caps in intimate contact with the oil. Gas not absorbed, which is frequently called residue gas, is withdrawn through a pipe 13. Absorption oil containing constituents absorbed from the feed gas is termed rich oil or fat oil, and this rich oil is removed through a pipe 15 and is introduced into one or more flash vessels 27. One or more flash vessels 27 are used as desired. Flashed gases from vessels 27 are combined and pass through pipes 28 and 22 into a reabsorber 23. This vessel also is provided with suitable vapor-liquid contact promoting apparatus such as bubble cap tray assemblies. Mineral seal oil flows through a pipe 25 into the upper portion of the reabsorber 23 for recovery by absorption of absorbable constituents of the gas entering by way of pipe 22. Unabsorbed gas leaves this reabsorber as fuel gas through a pipe 24. Rich oil leaves the reabsorber by way of a pipe 26 and enters the flash separators 27. Enriched absorption oil from the absorber and from the reabsorber containing dissolved constituents which are not flash vaporized in 27 flows from the flash vessel or vessels through a pipe 15a into a still 34. In this still hydrocarbons absorbed in the absorber 12 and in the reabsorber 23 are distilled overhead and passed through a pipe 35 into a dephlegmator 16. In this dephlegmator water is circulated via pipe 32, cooler 29, by a pump 30 to the upper portion of the dephlegmator to condense low boiling ends of the absorption oil inadvertently distilled overhead in still 34. This condensed absorption oil and any other hydrocarbons condensed in the dephlegmator return to the still through a pipe 33. Fresh water for starting up the dephlegmator, and makeup water as required, are added to the system through a pipe 32a, from a source not shown. Excess water not needed in the dephlegmator is withdrawn therefrom through a pipe 31 for such disposal as desired. Steam for heating the kettle contents of the still is introduced by way of a pipe 42.

The absorption oil freed from absorbed hydrocarbons or, as it is termed, lean oil leaves the still through a pipe 43, is cooled in cooler 44, and flows on to a lean absorption oil run storage vessel 45. From this run storage vessel the absorption oil passes through a pipe 46 under the influence of a pump 47 for passage through pipe 14 to absorber 12 and through pipe 25 to reabsorber 23.

Hydrocarbons not condensed in dephlegmator 16 pass through a pipe 17 and a pressure reducing valve 18 into a high stage or high pressure separator 19. Uncondensed gas separated in this flash step is recycled via pipe 20, pipes 53 and 22 to the reabsorber. Condensate separated in the flash step is passed by way of a pipe 21 into a de-ethanizing fractionator 48 in which ethane and lower boiling materials are separated under such conditions as to make a separation between ethane and propane with the ethane and lighter material passing overhead through a pipe 49, condenser 50, and a chiller 51. The condensate and uncondensed gases issuing from chiller 51 are passed into an accumulator 51a, the condensate passing through a pipe 52 into the upper part of the de-ethanizer as reflux, the uncondensed gases passing through pipes 53 and 22 into the reabsorber 23 for reabsorption treatment along with the flash gases from the flash step 19 and flashed gases from flash vessels 27. De-ethanized gasoline, which is intended to be free or substantially free from ethane and lighter boiling materials and to contain as much propane as possible and higher boiling material, is withdrawn from the de-ethanizer through a pipe 54 to such disposal as desired.

In such absorption plants as that described hereinabove, it is customary to employ only a predetermined volume of absorption oil. The amount of absorption oil involved in the process will be dependent upon the volume of feed gas to be treated, the capacity of the stripper vessel or still, and the capacities of the various pumps which transfer the absorption oil from one location to another, as well as the capacity of the run storage tank 45. As is well known in absorption plant practice, while it is desired to make as clean a separation as possible between, for example, ethane and propane, the separation is never complete. Such plants therefore operate under such conditions as to lose as little propane in the absorber and reabsorber off gases as possible with inclusion of as little ethane as possible in the absorber and reabsorber rich oils.

In FIGURE 1, the recycle gases flowing in pipe 20 can originate in separator vessel 19 only, or they can originate in separator vessel 19 and in one or more other gasoline absorption plants, as represented by 12a in FIGURE 1. Some further propane is lost, however, in the flashing and distillation steps for removing ethane from the absorption oil.

This invention is directed specifically to means and a method for minimizing the loss of propane in the off gases from the absorber and reabsorber by properly dividing the stream of lean oil from pipe 46 so that the proper proportions of the lean oil will flow through pipe 14 to the absorber 12 and through pipe 25 into the reabsorber 23 to reduce to a minimum the combined loss of propane in the off gases flowing through pipes 13 and 24. As will be realized, if too large a proportion of the lean oil, available from pipe 46, flows into the absorber 12, the loss of propane in the off gas through pipe 13 will be small but at the same time the flow of lean oil into the reabsorber 23 will be small and the loss of propane from this vessel through the off gas pipe 24 will be inadvertently great with the result that the total loss of propane from the plant may be greater than the total loss of propane if the lean oil from pipe 46 were properly proportioned between pipes 14 and 25. Thus, the proper proportion of the lean oil from pipe 46 for passage through pipes 14 and 25 is the main object and purpose of this invention. A fixed flow of lean absorption oil is available for use in the pair of absorbers.

FIGURE 2 illustrates the relationship between the absorption oil rate to the absorber and to the reabsorber and the combined propane loss from the absorber and reabsorber for different gas feed rates to the absorber and to the reabsorber.

According to this invention we provide apparatus and a method for determining the loss of propane in the off gases or residue gases flowing through pipes 13 and 24 and for proportioning the flow of absorption oil to the absorber and to the reabsorber to minimize the combined propane losses from the absorber and reabsorber.

Referring now to FIGURE 3, apparatus is illustrated for proportioning the flow of lean absorption oil through pipes 14 and 25 to the absorber 12 and reabsorber 23, respectively, in response to the combined loss of propane.

A valved pipe 56a leads off gas or residue gas from pipe 13 to an analyzer recorder such as a chromatographic analyzer recorder 57a. This instrument is an analyzer-recorder such as is fully described in U.S. Patent 2,875,606, and in a copending application, Serial No. 746,768, filed July 7, 1958, now Patent No. 2,994,646, issued August 1, 1961. Such analyzers are based on the absorption of components of a gaseous stream in an adsorption column filled with such an adsorber as silica gel, activated charcoal, or the like. The analyzer-recorder of 2,875,606 records the concentration of propane in a sample of the off gas flowing through pipe 13 and it transmits a signal to a peak reader 58a which records the concentration of propane in this gaseous stream. A suitable peak reader for use with a chromatographic analyzer is described in a copending application, Serial No. 727,606, filed April 10, 1958. The chromatographic analyzer of Patent No. 2,994,646 includes peak reader circuits so that a separate peak reader instrument is not required. In this case peak readers 58a and 58b are built into the corresponding analyzers 57a and 57b. Thus, the signals emerging from the analyzer-peak reader units correspond to the compositions of the gas stream with respect to their propane contents. When the peak reader is a separate instrument and is not constructed integral with the analyzer as in Serial No. 746,768, the peak reader described in a copending application, Serial No. 727,606, filed April 10, 1958, can be used. In this latter application, as mentioned, a peak reader is described as being separate from a chromatographic analyzer, and the operation of the peak reader is described in conjunction with a chromatographic analyzer.

An orifice plate 59a is inserted in pipe 13 and it communicates with a differential flow transmitter 60a, such as a Foxboro d./p. cell and the differential pressure developed across orifice plate 59a is transmitted by the differential pressure transmitter to a square root extractor 61a. This square root extractor can be any commercially available instrument which provides a signal that is linear and directly proportional to rate of flow such as a Minneapolis-Honeywell Sorteberg force bridge, as described in U.S. Patent 2,643,055. The linear signal from the square root extractor 61a, proportional to the rate of flow, and the linear signal from the peak reader 58a, proportional to the propane concentration, are supplied to the analog multiplier 62a which produces a pneumatic output signal proportional to the product of the rate of flow times propane concentration thereby giving, for example, a value proportional to pounds per day of propane in the absorber off gas.

A similar set of apparatuses is used in analyzing and determining the flow rate of the off gas from the reabsorber 23 as was used with the off gas from the absorber 12. Thus, a valved pipe 56b communicates with pipe 24 and transmits gas from pipe 24 to a chromatographic analyzer-recorder 57b which, in cooperation with a peak reader 58b, transmits a signal to an analog multiplier 62b which is proportional to the propane concentration in pipe 24. An orifice plate assembly 59b is provided in pipe 24 and a differential pressure from this assembly is transmitted to a differential pressure transmitter 60b, which transmits a signal proportional to the differential pressure to a square root extractor 61b which provides a signal that is linear and directly proportional to the rate of flow of gas in pipe 24. The linear signal from this square root extractor 61b, proportional to rate of flow, and the linear signal from the peak reader 58b, proportional to propane concentration, are supplied to analog multiplier 62b which produces a pneumatic output signal proportional to the product of rate of flow times propane concentration. The output signal from the analog multiplier 62b and the corresponding signal from analog multiplier 62a are transmitted to a totalizer or adder 63 which can be any conventional commercial instrument, such as, for example a Foxboro Model 56-1 computing relay, as described in Foxboro Bulletin TI-37-57a. The added signal from totalizer or adder 63 is recorded on a total loss recorder, 63b.

A flow rate controller assembly 55, which includes a motor valve and a differential pressure orifice plate assembly, is installed in pipe 14 for regulation or control of the rate of flow of lean absorption oil in this pipe. This flow rate control assembly can be any conventional commercially available flow rate control assembly such as, for example, the Model 58 instrument of the Foxboro Company, Foxboro, Massachusetts.

For adjusting manually the set point of the flow rate controller 55, the operator can make exploratory changes in oil rates through pipes 14 and 25 to see whether he can reduce the total loss of propane as indicated by the totalizer or adder 63. If an increase of oil to the absorber 12 (decrease to the reabsorber 23) results in a decreased loss of propane, he knows that the change in oil flow through pipe 14 was in the proper direction and vice versa; that is, if the change in oil flow caused an increase in loss of propane, he knows that a change was made in the wrong direction. Thus, upon setting and resetting the set point of the flow rate controller 55 manually, and observing the propane loss, it is a simple matter to determine when the propane loss is at a minimum. For example, when a point is reached where a small increase and a small decrease in the oil flow rate to the absorber 12 results in increased propane losses, the operator knows that he has found the point of minimum loss of propane as a function of oil rate to the absorber, or as a function of the ratio of oil rate to the absorber relative to the oil rate to the reabsorber.

The same result can be achieved automatically by using a Quarie controller, identified hereinafter, to close the loop from the totalizer or adder 63 to the flow rate controller 55. This type of control is preferable to the manual "cut and try" method described above because the Quarie controller continuously seeks the minimum and this controller is not confused by a change in the level of the minimum loss of propane which results from a feed volume or composition change. The application of the Quarie controller to this operation is illustrated in FIGURE 4. In this figure the totalizer 63 is the same instrument as illustrated in FIGURE 3 and likewise the flow rate controller 55 is similar to that instrument illustrated in FIGURE 3. The added or totalized signal from totalizer 63 is supplied by way of conduit 65 to a Quarie optimal controller 64 which can be any conventional and commercially available instrument which produces a signal output to alter the value of a process variable. It receives a measured value from the process adder 63 relative to the effect of the change imposed, computes the ratio of the measured effect to the change imposed, compares this ratio to a desired ratio (in this case a ratio of zero is desired), and produces a new signal in the proper direction and magnitude to decrease the difference between actual and desired ratio. Such a controller is a Quarie optimal controller manufactured by Quarie Controllers, Sharon, Massachusetts. This controller is described in Instruments and Automation, vol. 29, pp. 2212–16, No. 11, November 1956. This optimal controller continually resets the set point of the flow rate controller 55 to regulate the flow of the lean absorption oil through pipe 14 and, by difference, the flow of lean absorption oil through pipe 25 to obtain the minimum propane loss in the residue gases from the absorber and from the reabsorber.

In FIGURE 5 is illustrated the same general plan of operation but with a smaller number of instruments, for reasons of economy.

In FIGURES 1, 3, 4, and 5, like reference numerals indicate like apparatus parts.

In FIGURE 5 there is only one analyzer-recorder 57, one multiplier 62, and one square root extractor 61 in place of two of each of these instruments in FIGURES 3 and 4. In FIGURE 5 pipe 13 leads the residue gas from absorber 12 and the propane content of the gas in this pipe is the material which is to be determined and which is used as one component in this operation. Pipe 56a conducts a sample of this off gas from pipe 13 through a solenoid valve 67 to the analyzer-recorder 57. Pipe 56b conducts a sample of the off gas from reabsorber overhead line 24 through a solenoid valve 69 into the same analyzer-recorder 57. A programmer or timer 71 actuates solenoid valves 67 and 69 and the analyzer-recorder 57 at timed intervals so that gas from only one of the absorber 12 and of the reabsorber 23 passes through the analyzer-recorder 57 for analysis at one time. When timer 71 opens solenoid valve 67 and closes solenoid valve 69, gas flows through pipe 56a to the analyzer-recorder 57 and a signal therefrom is transmitted to multiplier 62. At the time solenoid valve 67 is open, timer 71 actuates a relay 73 by way of connection 75 to close contact 73–1 in order to prepare peak reader 58a to receive a series of peak signals from multiplier 62. The programmer in analyzer 57 closes switch 74–1 in relay 74 for the proper time interval to permit peak reader 58a to accept only the propane peak product signal from the multiplier and after this time interval the switch arm of relay 74 is positioned to a neutral position 74–N. This peak signal is stored in peak reader 58a and a signal proportional to this propane peak product is continuously fed to the adder 63. To complete the data for use in the multiplier 62 at the time the timer 71 opens solenoid valve 67 and closes the circuit to contact 73–1, the timer also closes the circuit 72–1 in relay 72 so that the apparatus can take into account the rate of flow of off gas in pipe 13. The rate of flow signal from the differential pressure transmitter 60a is transmitted through contact 72–1 of relay 72 to the square root extractor 61. The signal from this extractor is transmitted to the multiplier 62 at the same time the signals, which are proportional to the peaks of all the components in the off gas from absorber 12, from the analyzer-recorder 57, are transmitted to the multiplier. Signals proportional to the product of the flow rate and the peaks of all components in the off gas from the absorber are transmitted to the peak reader 58a. This peak reader, however, accepts only the signal proportional to the product of the propane peak and the absorber off gas flow rate and transmits a signal which is proportional to this product continuously to the adder.

At the time the timer 71 opens solenoid valve 69, valve 67 is closed, the timer actuates relay 73 by way of connection 75 to close contact 73–2 in order to prepare peak reader 58b to receive a series of peak signals from multiplier 62. The programmer in analyzer 57 closes switch 74–2 in relay 74 for the proper time interval to permit peak reader 58b to accept only the propane peak product signal from the multiplier and after this time interval the switch arm of relay 74 is returned to its neutral position 74–N. This peak signal is stored in peak reader 58b and a signal proportional to this propane peak product is continuously fed to the adder or totalizer 63. To complete the data at the time the timer 71 opens solenoid valve 69 (and closes valve 67) and closes the circuit to contact 73–2, the timer also closes the circuit 72–2 in relay 72 so that the apparatus can take into account the rate of flow of off gas in pipe 24. The rate of flow signal from the differential pressure transmitter 60b is transmitted through contact 72–2 of relay 72 to the square root extractor 61. The signal from this extractor is transmitted to the multiplier 62 at the same time the signal which is proportional to the peaks of all the components in the off gas from the reabsorber 23 from the analyzer-recorder 57 is transmitted to the multiplier. Signals proportional to the products of the flow rate and the peaks of all components in the off gas from the reabsorber are transmitted to the peak reader 58b. This peak reader, however, accepts only the signal proportional to the product of the propane peak and the reabsorber off gas flow rate and transmits a signal, which is proportional to this product, continuously to the adder.

The adder 63 continuously algebraically adds the signals from the peak readers and transmits the added signal through conduit 65 to the Quarie controller 64 which, in turn, emits an output signal through conduit 66. This signal from conduit 66 resets the flow rate controller 55 for adjusting the ratio of absorption oil flow to the absorber and reabsorber to reduce the combined propane contents of the off gases therefrom to a minimum.

FIGURE 6 illustrates the operating sequences of several pieces of equipment in relation to each other. For example, the propane peak from the chromatograph analyzer 57 nearest the vertical coordinate is the propane peak of the gas flowing through valve 67, valve 69 being closed. Also, the "switch 74" line shows that switch 74 is moved from its neutral position to contacts 74–1 or 74–2, thereby allowing the respective peak readers 58a and 58b to receive signals from the multiplier only at the time the signal from the chromatograph is reporting the propane peak. The line "output of 63" represents the output signal of the adder 63 and is the algebraic sum of the signals represented in the lines marked "output of 58a" and "output of 58b."

Thus, in this manner, several rather costly instruments are not needed to obtain the same results as obtained in the use of the apparatus illustrated in FIGURE 4.

The several relays 72 and 73, timer 71, and the solenoid valves 67 and 69 are among the less expensive pieces of equipment. At the time solenoid valve 69 is closed, vent tube 70 of this valve is open and, similarly, when solenoid valve 69 is closed as regards flow of gas through pipe 56a, vent tube 68 is open.

It is noted that by employing the Quarie optimum controller the flow rate controller continuously adjusts the ratio of the flow rate of the lean absorption oil in pipe 14 to that in pipe 25 to maintain a minimum loss of the combined propane in the overhead gases from absorber 12 and reabsorber 23. There will always be a loss of propane in these two off gas streams but regardless of what the loss level is, the Quarie controller will hold it at a minimum.

In FIGURES 3 and 5, as examples of suitable equipment, absorber 12 contains 29 seven-foot diameter trays. The reabsorber is the same size and contains the same number of trays as absorber 12.

Obtained under the illustrative conditions are the following material balance data of the absorber and reabsorber. The reabsorber material balance includes feed material from two gasoline plants, as illustrated in FIGURE 1.

*Illustrative Absorber and Reabsorber Material Balances*

| | Absorber (7' x 29 Trays) Pressure—548 p.s.i.a. Temperature: Top—92 F. Bottom—98 F. | | | Reabsorber (7' x 29 Trays) Pressure—587 p.s.i.a. Temperature: Top—103 F. Bottom—105 F. | | |
|---|---|---|---|---|---|---|
| | Absorber, Mols/Day | | | Reabsorber, Mols/Day | | |
| | Feed | Residue | Rich Oil | Feed | Residue | Rich Oil |
| $CO_2$ | 632 | 552 | 80 | 749 | 639 | 110 |
| $N_2$ | 5,316 | 5,242 | 74 | 668 | 656 | 12 |
| $H_2S$ | 1,187 | 770 | 417 | 5,379 | 2,962 | 2,417 |
| $CH_4$ | 84,846 | 79,956 | 4,890 | 41,286 | 38,270 | 3,016 |
| $C_2$ | 14,503 | 10,505 | 3,998 | 44,609 | 29,086 | 15,523 |
| $C_3$ | 7,001 | 1,716 | 5,285 | 16,567 | 2,140 | 14,427 |
| $nC_4$ | 2,224 | 0 | 2,224 | 1,032 | 0 | 1,032 |
| $iC_4$ | 582 | 0 | 582 | 385 | 0 | 385 |
| $nC_5$ | 525 | 0 | 525 | 65 | 0 | 65 |
| $iC_5$ | 539 | 0 | 539 | 89 | 0 | 89 |
| $C_6$ | 336 | 0 | 336 | 15 | 0 | 15 |
| $C_7+$ | 143 | 0 | 143 | 4 | 0 | 4 |
| | Lean Oil Rate, 700,000 Gal./Day | | | Lean Oil Rate, 600,000 Gal./Day | | |

In FIGURE 2, the combined lean absorption oil rate to the absorber and reabsorber is 1,300,000 gallons per day. The following tabulation illustrates high and low lean oil feed rates to an absorber and to a reabsorber as disclosed herein when treating feed gases to the absorber and reabsorber in the following volumes, in terms of MM (million) standard cubic feet per day.

Lean oil feed rates to absorber:
  High—1,000,000 gals./day
  Low—600,000 gals./day
Lean oil feed rates to reabsorber:
  High—700,000 gals./day
  Low—300,000 gals./day
Gas feed rates to absorber:
  High—45 MM c.f./d.
  Low—36 MM c.f./d.
Gas feed rates to reabsorber:
  High—40 MM c.f./d.
  Low—32 MM c.f./d.

While certain embodiments of the invention have been described for illustrative purposes, the invention obviously is not limited thereto.

We claim:
1. An apparatus for minimizing the combined loss of a desired component in the residue gases from a pair of absorbers operated in parallel and wherein a fixed flow of lean absorption oil is available for use in the pair of absorbers, comprising, in combination, a separate outlet conduit for flow of residue gas from each absorber, a separate analyzing means communicating operably with each residue gas conduit for analyzing residue gas for content of said desired component, a separate peak reader means operatively connected with each anlayzing means for detecting peak contents of said desired component as detected by said analyzing means, a separate flow rate detector means in operative communication with each outlet conduit for detecting rates of residue gas flow therein, a separate square root extractor means operatively connected with each flow rate detector means, a separate multiplier connected operably with each peak reader and square root extractor, a totalizer operatively connected with the multipliers, a flow rate controller in the conduit for passage of lean absorption oil to one of said absorbers, a minimum controller operatively connected with said flow rate controller and with said totalizer, whereby said minimum controller resets the set point of said flow rate controller thereby regulating lean absorption oil flow in said conduit to said one of said absorbers to maintain a minimum signal from said totalizer representing minimum flow of said desired component in the residue gas conduits.

2. A method for separating in a pair of absorption steps, with flow of like liquid absorbents, gaseous mixtures to form a corresponding pair of residue gases containing together a minimum amount of a common component per unit of time comprising contacting a pair of gaseous mixtures of unlike compositions but containing said common component in a pair of absorption steps with streams of liquid absorbent at a fixed flow of absorbent to said absorption steps, the streams of liquid absorbents having the same compositions at the beginning of the contactings, withdrawing residue gases from said absorption steps containing reduced amounts of said common component, measuring the total quantity of said common component in said residue gases, dividing said liquid absorbent of fixed flow into said streams and passing one stream to one absorption step of said pair and passing the other stream to the other absorption step of said pair, and adjusting the relative rates of dividing of said liquid absorbent of fixed flow by regulating the rate of flow of said one stream of liquid absorbent to said one absorption step in response to the measured total quantity of said common component in such a manner as to maintain said total quantity of said common component at a minimum in said residue gases.

3. A method for separating in a pair of absorption steps with parallel flow portions of a liquid absorbent of like compositions gaseous mixtures of unlike compositions but containing a common component to form a corresponding pair of residue gases containing together a minimum amount of said common component per unit of time comprising contacting a pair of gaseous mixtures of unlike compositions but containing said common component in a pair of parallel absorption steps with, respectively, a pair of streams of liquid absorbent at a fixed flow of absorbent to said absorption steps, the streams of liquid absorbent having the same composition at the beginning of the contactings, withdrawing separate residue gases of unlike compositions but containing said common component, measuring the total quantity of said common component per unit of time in said residue gases, dividing the liquid absorbent of fixed flow into said pair of streams of liquid absorbent, and adjusting the dividing of liquid absorbent of mixed flow into said pair of streams by regulating the rate of flow of one stream to one absorption step in response to the measured total quantity of said common component in such a manner as to maintain said total quantity of said common component a minimum in said residue gases with respect to the original liquid absorbent of fixed flow.

4. A method for separating in a pair of absorption steps ethane, methane, and lower boiling gaseous materials and propane and minor proportions of higher boiling hydrocarbons normally found in natural gas to form a corresponding pair of residue gases containing together a minimum amount of propane per unit of time comprising contacting a pair of said gaseous mixtures of unlike compositions but containing propane in a pair of parallel absorption steps with, respectively, a pair of streams of liquid absorbent of a fixed flow of absorbent to said absorption steps, the streams of liquid absorbent having the same composition at the beginning of the contactings, withdrawing separate residue gases of unlike compositions but containing propane, measuring the total quantity of said propane per unit of time in said residue gases, dividing the liquid absorbent of fixed flow into said pair of streams of liquid absorbent, and adjusting the dividing of liquid absorbent of fixed flow into said pair of streams by regulating the rate of bow of one stream to one absorption step in response to the measured total quantity of propane in such a manner as to maintain said total quantity of propane a minimum in said residue gases with respect to the original liquid absorbent of fixed flow.

References Cited in the file of this patent

UNITED STATES PATENTS

| | | |
|---|---|---|
| 2,504,429 | Latchum | Apr. 18, 1950 |
| 2,771,149 | Miller et al. | Nov. 20, 1956 |
| 2,781,293 | Ragatz | Feb. 12, 1957 |
| 2,782,866 | Etherington et al. | Feb. 26, 1957 |

UNITED STATES PATENT OFFICE
CERTIFICATE OF CORRECTION

Patent No. 3,060,662            October 30, 1962

James R. Parsons et al.

It is hereby certified that error appears in the above numbered patent requiring correction and that the said Letters Patent should read as corrected below.

Column 8, line 19, for "flxed" read -- fixed --; column 9, line 12, for "mixed" read -- fixed --; column 10, line 13, for "bow" read -- flow --.

Signed and sealed this 2nd day of July 1963.

(SEAL)
Attest:

ERNEST W. SWIDER
Attesting Officer

DAVID L. LADD
Commissioner of Patents